(12) United States Patent
Duan et al.

(10) Patent No.: US 10,585,414 B2
(45) Date of Patent: Mar. 10, 2020

(54) USE OF FILTERED BASIS SPLINES TO COMPENSATE SERVO-INDUCED MOTION ERRORS

(71) Applicant: The Regents of The University of Michigan, Ann Arbor, MI (US)

(72) Inventors: Molong Duan, Ann Arbor, MI (US); Chinedum Okwudire, Ann Arbor, MI (US); Keval Ramani, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 109 days.

(21) Appl. No.: 15/747,573

(22) PCT Filed: Jul. 28, 2016

(86) PCT No.: PCT/US2016/044491
§ 371 (c)(1),
(2) Date: Jan. 25, 2018

(87) PCT Pub. No.: WO2017/019869
PCT Pub. Date: Feb. 2, 2017

(65) Prior Publication Data
US 2018/0217575 A1 Aug. 2, 2018

Related U.S. Application Data

(60) Provisional application No. 62/197,682, filed on Jul. 28, 2015.

(51) Int. Cl.
| G06F 19/00 | (2018.01) |
| G05B 19/404 | (2006.01) |
| G05B 19/41 | (2006.01) |

(52) U.S. Cl.
CPC .......... *G05B 19/404* (2013.01); *G05B 19/41* (2013.01); *G05B 2219/34135* (2013.01);
(Continued)

(58) Field of Classification Search
CPC .................. G05B 19/404; G05B 19/41; G05B 2219/34135; G05B 2219/34145;
(Continued)

(56) References Cited

U.S. PATENT DOCUMENTS

| 5,726,896 A | 3/1998 | Jia et al. | |
| 6,505,085 B1 * | 1/2003 | Tuttle | B25J 9/1605 |
| | | | 700/28 |

(Continued)

FOREIGN PATENT DOCUMENTS

EP 1235126 A1 8/2002

OTHER PUBLICATIONS

International Search Report and Written Opinion of the International Searching Authority issued in PCT/US2016/044491, dated Oct. 26, 2016; ISA/KR.

(Continued)

*Primary Examiner* — Kidest Bahta
(74) *Attorney, Agent, or Firm* — Harness, Dickey & Pierce, P.L.C.

(57) ABSTRACT

A method for minimizing tracking errors in dynamic systems including obtaining desired trajectory data of the dynamic system, obtaining a set of constraints on at least one of the desired and actual trajectories of the dynamic system, obtaining a set of uniform or non-uniform rational B-splines having known original B-spline basis functions but unknown B-spline coefficients, applying a trajectory optimization process to the desired trajectory data including applying forward filtering to B-spline basis functions and utilizing the original and filtered B-spline basis functions to
(Continued)

select optimal coefficients of the B-splines, and outputting an optimal motion command signal in response to the trajectory optimization process to the dynamic system such that a resultant actual trajectory is substantially equal to the desired trajectory while satisfying the set of constraints on the at least one of the desired and actual trajectories.

11 Claims, 5 Drawing Sheets

(52) U.S. Cl.
CPC ............ *G05B 2219/34145* (2013.01); *G05B 2219/35585* (2013.01); *G05B 2219/41217* (2013.01); *G05B 2219/41219* (2013.01)

(58) Field of Classification Search
CPC ........... G05B 2219/35585; G05B 2219/41217; G05B 2219/41219
See application file for complete search history.

(56) References Cited

U.S. PATENT DOCUMENTS

| | | | | |
|---|---|---|---|---|
| 6,782,306 | B2* | 8/2004 | Yutkowitz | G05B 19/4103 |
| | | | | 700/159 |
| 8,515,701 | B2* | 8/2013 | Swaringen | B23K 26/04 |
| | | | | 702/85 |
| 2003/0018400 | A1 | 1/2003 | Tuttle et al. | |
| 2005/0237325 | A1 | 10/2005 | Motter et al. | |
| 2007/0179685 | A1 | 8/2007 | Milam et al. | |
| 2008/0133982 | A1* | 6/2008 | Rawlins | H03F 1/0211 |
| | | | | 714/699 |
| 2010/0063603 | A1 | 3/2010 | Chandhoke | |
| 2013/0249905 | A1* | 9/2013 | Matthews | G06T 13/20 |
| | | | | 345/420 |

OTHER PUBLICATIONS

Dimitry Gorinevsky. "Learning Approximation of Feedforward Control Dependence on the Task Parameters with Application to Direct-Drive Manipulator Tracking." IEEE Transactions on Robotics and Automation, vol. 13, No. 4. Aug. 1997.

Extended European Search Report of the European Patent Office issued in EP 16831354.2, dated Mar. 18, 2019.

* cited by examiner

USE OF FILTERED BASIS SPLINES TO COMPENSATE SERVO-INDUCED MOTION ERRORS

CROSS-REFERENCE TO RELATED APPLICATIONS

This application is a U.S. National Phase Application under 35 U.S.C. 371 of International Application No. PCT/US2016/044491 filed on Jul. 28, 2016 and published in English as WO 2017/019869 A1 on Feb. 2, 2017. This application claims the benefit of U.S. Provisional Application No. 62/197,682, filed on Jul. 28, 2015. The entire disclosures of the above applications are incorporated herein by reference.

GOVERNMENT INTEREST

This invention was made with government support under CMMI1350202 awarded by the National Science Foundation. The Government has certain rights in the invention.

FIELD

The present disclosure relates to motion errors and, more particularly, relates to the use of filtered basis functions derived from a uniform or non-uniform rational B-spline curve to compensate for servo-induced motion errors.

BACKGROUND AND SUMMARY

This section provides background information related to the present disclosure which is not necessarily prior art. This section provides a general summary of the disclosure, and is not a comprehensive disclosure of its full scope or all of its features.

The present teachings provide an approach for minimizing tracking errors in dynamic systems (including those with non-minimum phase (NMP)) zeros by using filtered basis splines (B-splines). The output of the tracking controller is represented as a linear combination of B-splines having unknown coefficients. The basis functions are forward filtered using the dynamics of the system and their coefficients selected to minimize the errors in tracking a given trajectory. Among many other benefits, the use of B-splines allows: (i) constraints to be imposed on the input and outputs of the system as linear functions of the spline coefficients; (ii) non-zero initial conditions to be imposed; (iii) tracking of higher order derivatives; and (iv) the use of limited look ahead capabilities in the filtering process.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Tracking of Dynamic Systems Including Input or Output Constraints

Figure 1:
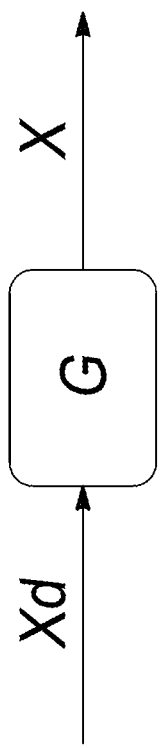
FIG. 1 shows the dynamics of a CNC feed axis including unwanted vibration modes.

The goal of tracking control is to force the output of a system to follow a desired trajectory as closely as possible. Consider a linear time-invariant (LTI) dynamic system with transfer function G, as shown in FIG. 1. The goal of tracking control is to ensure that the actual trajectory, $\chi$, follows the desired trajectory, $\chi_d$, as closely as possible, while satisfying constraints imposed on $\chi$ and/or $\chi_d$ (or their time derivatives).

Furthermore, consider a specific example where G represents the dynamics of the feed axis of a CNC machine with unwanted vibration modes, given by $$G(s) = \sum_{i=1}^{M} \frac{\alpha_i + \beta_i S}{S^2 + 2\zeta_i \omega_{n,i} S + \omega_{n,i}^2} \quad (1)$$

where M represents the number of modes, while $\alpha_i$ and $\beta_i$ are the residue constants, $\zeta_i$ is the damping ratio and $\omega_{n,i}$ is the natural frequency of the $i^{th}$ mode in rad/s. Using tracking control, it is desired to generate $\chi_{dm}^*$, a modified and optimized version of desired position trajectory $\chi_d$, such that, when applied to the feed axis in place of $\chi_d$, minimizes the tracking errors caused by G while satisfying the kinematic limits of the machine axis.

Figure 2:
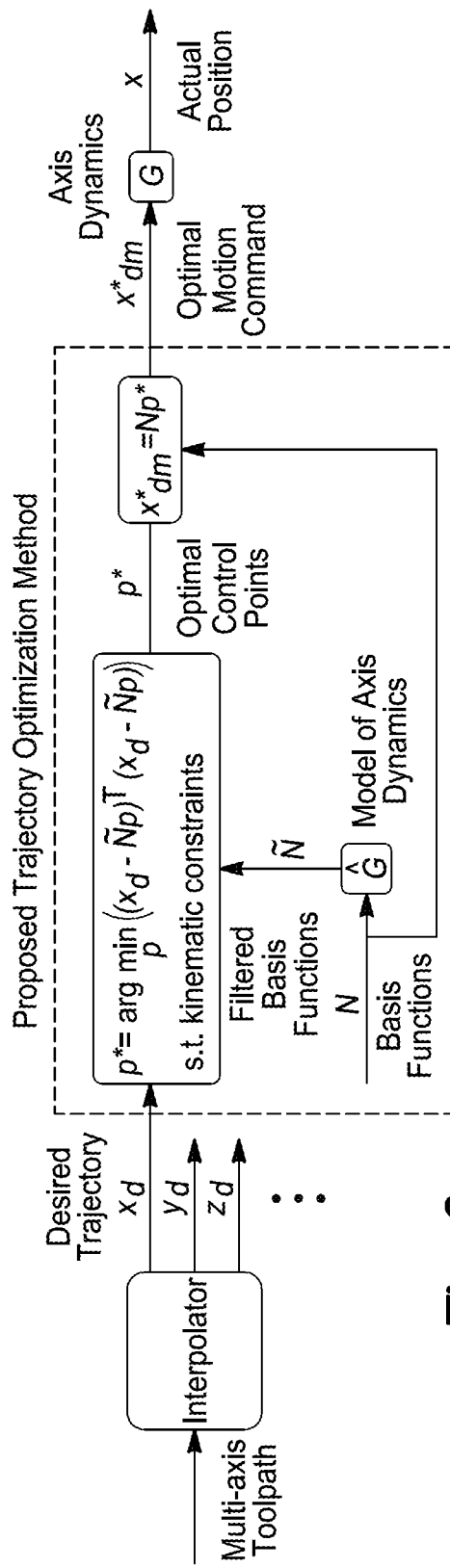
FIG. 2 is a flow chart of the proposed approach

FIG. 2 shows a block diagram of the approach according to the present teachings for generating $\chi_{dm}^*$ using filtered B-splines. Let $\chi_d = [\chi_d(0) \chi_d(1) \ldots \chi_d(E)]^T$ represent E+1 discrete time steps of the x-component of a toolpath interpolated by a CNC (i.e., the desired trajectory). We assume that the CNC has look ahead capabilities such that the E+1 time steps of $\chi_d$ are known in advance. Furthermore, we assume that the modified but un-optimized motion command, $\chi_{dm} = [\chi_{dm}(0) \chi_{dm}(1) \ldots \chi_{dm}(E)]^T$, is parameterized in the CNC using B-splines such that $$\underbrace{\begin{bmatrix} \chi_{dm}(0) \\ \chi_{dm}(1) \\ \vdots \\ \chi_{dm}(E) \end{bmatrix}}_{\chi_{dm}} = \underbrace{\begin{bmatrix} N_{0,m}(\xi_0) & N_{1,m}(\xi_0) & \ldots & N_{n,m}(\xi_0) \\ N_{0,m}(\xi_1) & N_{1,m}(\xi_1) & \ldots & N_{n,m}(\xi_1) \\ \vdots & \vdots & \ddots & \vdots \\ N_{0,m}(\xi_E) & N_{1,m}(\xi_E) & \ldots & N_{n,m}(\xi_E) \end{bmatrix}}_{N} \underbrace{\begin{bmatrix} p_0 \\ p_1 \\ \vdots \\ p_n \end{bmatrix}}_{P} \quad (2)$$

For a B-spline of degree m, having n+1≤E+1 control points, $p_0, p_1, \ldots, p_n$, and knot vector, $[g_0 g_1 \ldots g_{m+n+1}]^T$, $N_{j,m}(\xi)$ are real-valued basis functions given by $$N_{j,m}(\xi) = \frac{\xi - g_j}{g_{j+m} - g_j} N_{j,m-1}(\xi) + \frac{g_{j+m+1} - \xi}{g_{j+m+1} - g_{j+1}} N_{j+1,m-1}(\xi) \quad (3)$$

$$N_{j,0}(\xi) = \begin{cases} 1 & g_j \leq \xi < g_{j+1} \\ 0 & \text{otherwise} \end{cases}$$

where j=0,1, ..., n and $\xi \in [0,1]$ is the spline parameter, representing normalized time, which is discretized in Eq. (2) into E+1 uniformly spaced points, $\xi_0, \xi_1, \ldots, \xi_E$. The knot vector can be selected to be uniform, such that $$g_k = \begin{cases} 0 & 0 \leq k \leq m \\ \frac{k-m}{n-m+1} & m+1 \leq k \leq n \\ 1 & n+1 \leq k \leq m+n+1 \end{cases} \quad (4)$$

Notice that if $\chi_{dm}$ given in Eq. (2) is applied as the motion command to the CNC feed axis of FIG. 1, in place of $\chi_d$, the control point vector, p, is not affected by G, because p is not a function of time; however, the basis functions matrix, N, which is a function of time, is filtered by G. Therefore, the resulting position $\chi = [\chi(0) \chi(1) \ldots \chi(E)]^T$ can be approximated by $$\chi = \tilde{N}P \quad (5)$$

$$e = \chi_d - \chi = \chi_d - \tilde{N}p \quad (6)$$

One useful mathematical property of B-splines is that the derivative of a B-spline curve is also a B-spline curve that can be expressed linearly in terms of the control points of the original curve. Hence, the $r^{th}$ derivative of $\chi_{dm}$ can be written as $$\frac{d^r \chi_{dm}}{dt^r} = N_r p \quad (7)$$

where $N_r$ is the basis function matrix for the $r^{th}$ derivative of position; its elements can be calculated readily from those of N. Therefore, to achieve the stated objective of the present teachings, $\chi_{dm}^* = Np^*$ can be generated using optimal control points, $p^*$, calculated to minimize the objective function given by $$p^* = \arg\min_p (e^T e) = \arg\min_p ((\chi_d - \tilde{N}p)^T (\chi_d - \tilde{N}p)) \quad (8)$$

$$\text{s.t.} \quad \|N_r p\|_\infty \leq L_r$$

where $L_r$ represents the kinematic limit associated with the $r^{th}$ derivative of $\chi_{dm}$ (e.g., its velocity, acceleration and jerk limits), while $\|\cdot\|_\infty$ denotes the infinity norm (i.e., the maximum absolute value of the elements) of a vector.

Note that constraints can be similarly placed on the output, $\chi$, and its derivatives by swapping $N_r$ in Eq.(8) with $\tilde{N}_r$ (i.e., the filtered version of $N_r$).

Notice that, if the kinematic constraints are not considered, the solution to Eq. (8) reduces to a traditional least-squares fitting problem where $$p^* = ((\tilde{N}^T \tilde{N})^{-1} \tilde{N}^T) \chi_d \quad (9)$$

However, with the constraints included, Eq. (8) becomes a least squares problem with inequality constraints, which has a guaranteed solution as long as the constraints are feasible. The solution is unique if the matrix $\tilde{N}$ is full rank (i.e., if the filtered basis functions are linearly independent). The present method achieves trajectory parameterization, constraint enforcement and optimization simultaneously using industry-standard B-splines and basic least squares techniques, making it easy to use. Notice also that both $\chi_d$ and $\chi_{dm}^*$ have the same length (i.e., E+1), meaning that the proposed method does not sacrifice motion speed. Though the method has been discussed for a single axis (i.e., $\chi$), it is readily applicable to multiple axes of a CNC machine by treating each axis separately; therefore, it is very systematic and scalable.

Handling of Non-Zero Initial Conditions

In tracking control, the trajectory to be tracked could have non-zero initial conditions associated with the trajectory itself, as well as with its higher-order derivatives. This is realized through the linear relationship between the control points and the higher order derivatives in Eq. (7). For example, the first derivative of $\chi_{dm}$ at initial time $\xi_0$ (i.e., when $\xi = \xi_0$) is expressed as $$x_{dm}'(\xi_0) = m(n-m+1)(p_1 - p_0) \quad (10)$$

Higher order derivatives of Eq. (7) can be obtained in a similar manner. Note that the value of the first derivative at $\xi = \xi_0$ depends on the first two control points. The value of second derivative will depend on the first three control points and so on. Consequently, an initial condition on the $r^{th}$ derivative of a given trajectory constraints the first r+1 control points associated with the trajectory (where r<m).

Hence, the initial conditions of $x_d$ (which are the same as those of $x_{dm}$) can be expressed as $$Qp = z \quad (11)$$

where z is a vector of initial conditions and Q is a matrix comprising the coefficients obtained from Eqs. (7) and (10), and similar equations derived for higher order derivatives. Accordingly, Eqs. (9) and (11) can be combined to obtain $$\begin{bmatrix} \tilde{N}^T \tilde{N} & Q^T \\ Q & 0 \end{bmatrix} \begin{Bmatrix} p \\ \lambda \end{Bmatrix} = \begin{Bmatrix} \tilde{N}^T x_d \\ z \end{Bmatrix} \quad (12)$$

where is a vector of Lagrange multipliers. The solution of Eq. (12) (in a manner similar to Eq. (9)) results in minimum tracking error while satisfying the conditions given by Eq. (11).

Enhanced Tracking of Higher Order Derivatives

In certain tracking applications, e.g., position tracking in robots and CNC machines, it may be of interest to also maintain close tracking of higher order derivatives of the desired trajectory, e.g., velocity and acceleration. The B-spline framework is very useful in this regard.

Filtering $N_1, N_2, \ldots N_r$ using G gives, $\tilde{N}_1, \tilde{N}_2, \ldots, \tilde{N}_r$, respectively. Consequently, accurate tracking of $\chi_d$ and its first r derivatives can be achieved by solving the composite equation given by $$\underbrace{\begin{bmatrix} \tilde{N} \\ \alpha_1 \tilde{N}_1 \\ \vdots \\ \alpha_r \tilde{N}_r \end{bmatrix}}_{\overline{N}} p = \underbrace{\begin{Bmatrix} x_d \\ \alpha_1 \dot{x}_d \\ \vdots \\ \alpha_r \frac{d^r x_d}{dt^r} \end{Bmatrix}}_{\overline{x}} \quad (13)$$

where $\alpha_1, \alpha_2, \ldots \alpha_r$ are user-defined weights attached to each derivative of $\chi_d$ to indicate its importance relative to position tracking. The solution of Eq.(14) can be obtained using least squares in a manner similar to Eq.(9).

Limited Look Ahead

In explaining the proposed method so far, it has been assumed that all E+1 points of the trajectory, $x_{dm}$, is known, and that the optimal coefficients p* have been solved using all E+1 points of $x_{dm}$. Basically, complete (total) look ahead capability has been assumed.

However, in practice $x_{dm}$ may not be known in its entirety; instead it may be available in smaller batches (subsets) which sequentially combine to form $x_{dm}$ in its entirety. Even when all of $x_{dm}$ is available, it may be computationally prohibitive (e.g., for real time implementation) to use all of $x_{dm}$ at once for generating p*.

In such cases, the application of the proposed method can be performed sequentially (recursively) using smaller subsets of $x_{dm}$, thus provided limited look ahead as opposed to complete look ahead capability.

One way of doing this is to generate matrices N and $\tilde{N}$ as described above and then partition them into smaller submatrices correctly sized to match any subset of $x_{dm}$ that is available. A corresponding subset of the optimal coefficient vector p* is then solved for using the smaller submatrices. This process is repeated sequentially for subsequent subsets of $x_{dm}$ (as they become available).

Continuity between solutions from each batch of $x_{dm}$ can be assured by creating some overlap between the submatrices and coefficients of successive subsets of $x_{dm}$.

Experimental Examples

Figure 3:
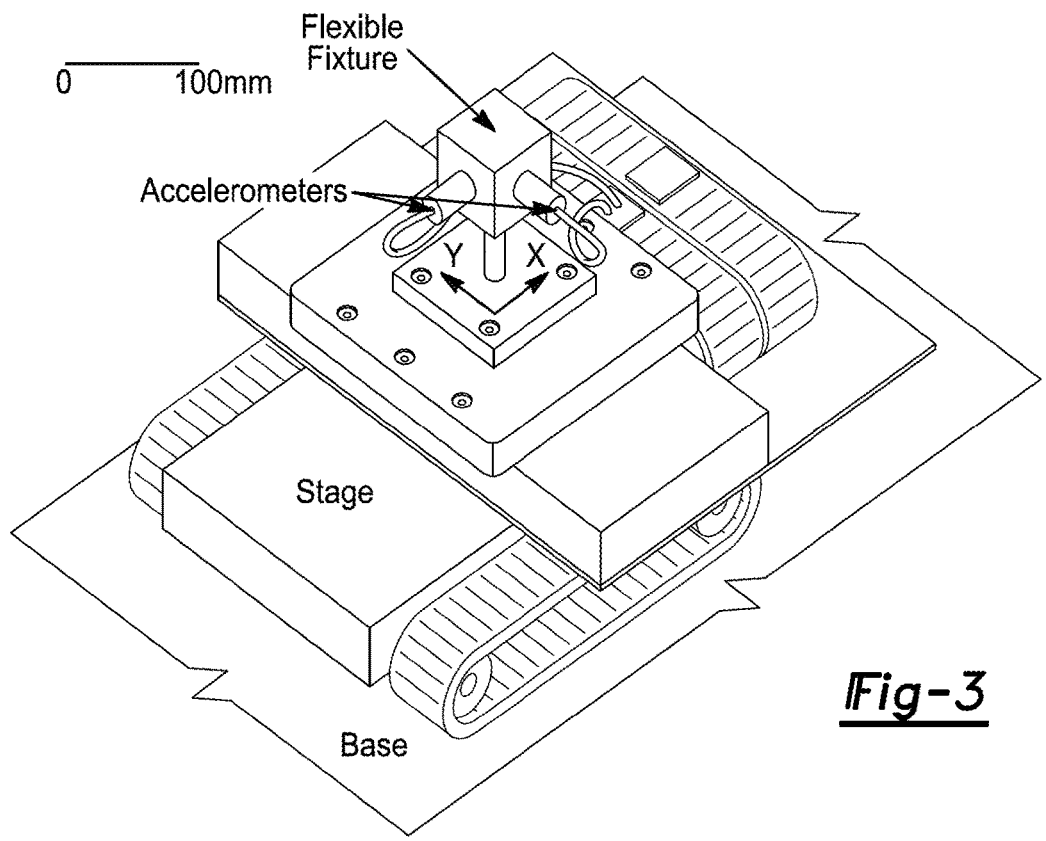
FIG. 3 shows the experimental setup i.e., a biaxial stage with a flexible fixture.

Experimental results are presented in this section to compare the proposed technique to the uncompensated case. The biaxial (X-Y) linear motor driven stage (Aerotech ALS 25010) shown in FIG. 3 is used for the experiments. The stage is controlled using a traditional P/PI feedback controller, augmented with velocity and acceleration feedforward. The controller is implemented on a dSPACE 1103 real-time control board with 10 kHz sampling frequency. The velocity and acceleration limits for both of its axes are $L_1=100$ mm/s and $L_2=8000$ mm/s$^2$, respectively. As shown in the FIG. 3, the stage is equipped with a fixture consisting of a block mounted on a rod. The block is assumed to represent an apparatus (e.g., a tool, workpiece or measurement device) whose x and y positions are expected to track their respective desired trajectories, $x_d$ and $y_d$, accurately, in spite of inherent structural flexibilities. The acceleration of the fixture is measured using two unidirectional accelerometers (PCB Piezotronics 393B05) shown in FIG. 3.

Figure 4:
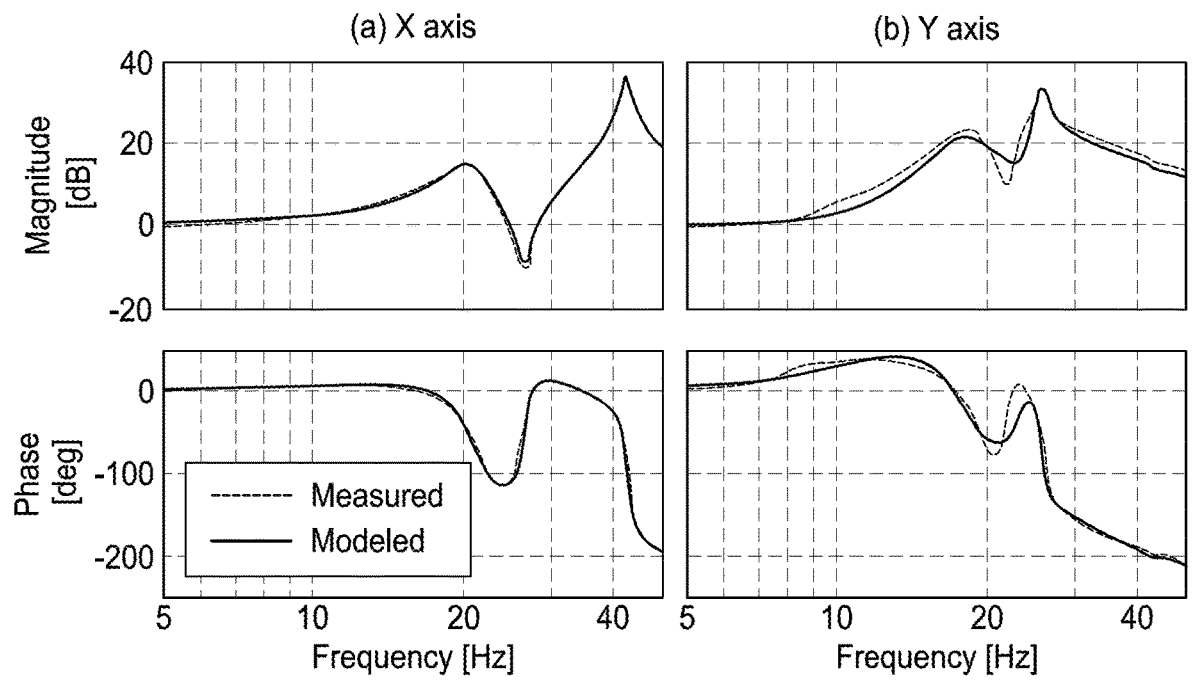
FIG. 4 shows the measured and modeled frequency response functions for the X and Y axis of the experimental setup.

FIG. 4 shows the frequency response function (FRF) of the dynamics G of each axis of the stage, generated by applying swept sine acceleration commands to the stage and measuring the corresponding accelerations of the fixture (i.e., and) using the accelerometers. The dynamics of each axis exhibits two dominant modes, which are very obvious in FIG. 4.

For each axis, the lower mode is a mode from the stage while the higher mode is from the flexible fixture (whose natural frequencies are different in the x and y directions because the mounting rod has a rectangular cross section). However, not obvious in FIG. 4 are two much less dominant modes in each FRF. In other words, there are four unwanted modes (M=4) in each axis' dynamics, whose parameters are identified using the rational fraction polynomial method, and are summarized in Tab. 1. FIG. 4 shows an excellent fit between the modeled and actual FRFs for the X-axis. The model for the Y-axis is not as accurate as that of the X-axis because the two dominant modes of the Y axis are relatively more damped and closer in resonance frequency, making it harder to curve fit them. However, the fitting errors of the Y axis provide an opportunity to test the performance of the proposed method in the presence of some modeling errors, which are likely to occur in practice.

TABLE 1

Model parameters of vibration dynamics for X and Y axes of stage

| Axis-Mode# | $\omega_{n,i}$ [Hz] | $\zeta_i$ | $\alpha_i$ | $\beta_i$ |
|---|---|---|---|---|
| X-1 | 20.52 | 0.092 | 15797.5 | 54.3 |
| X-2 | 34.94 | 0.540 | −135160.6 | −587.7 |
| X-3 | 42.53 | 0.029 | 189225.5 | −60.5 |
| X-4 | 42.60 | 0.007 | 14633.4 | −67.9 |
| Y-1 | 17.86 | 0.120 | 6709.0 | 310.4 |
| Y-2 | 25.70 | 0.021 | 42872.2 | 169.4 |
| Y-3 | 30.66 | 0.440 | −43178.2 | −1260.2 |
| Y-4 | 43.10 | 0.036 | −966.3 | 7.5 |

Figure 5:
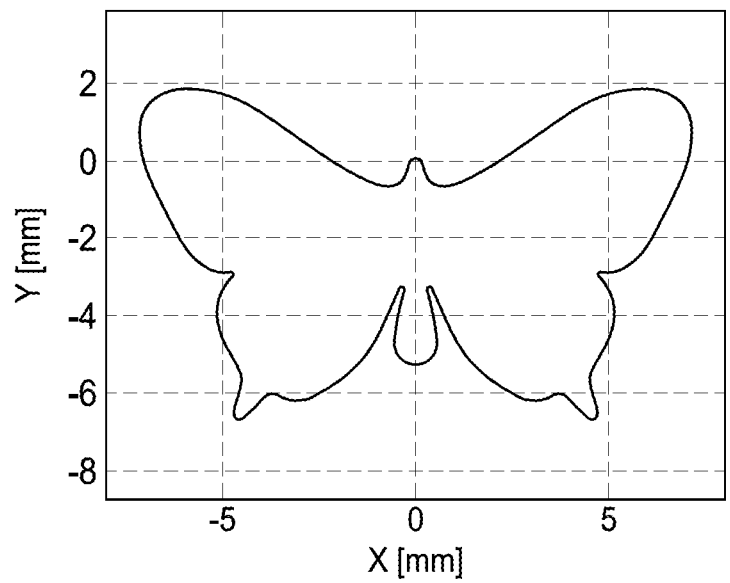
FIG. 5 shows the desired path used for experiments.
Figure 6:
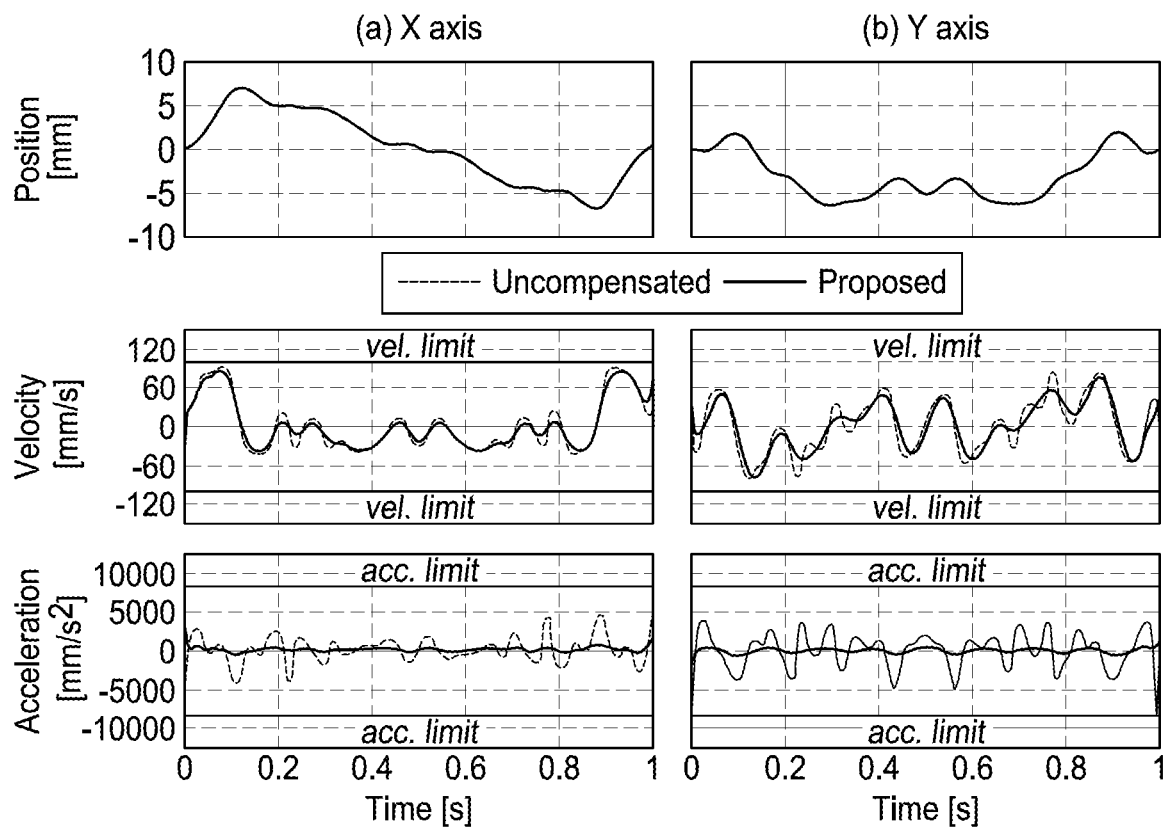
FIG. 6 shows the X and Y command signals for uncompensated and proposed method.

FIG. 5 shows the butterfly curve used as the desired path for the experiments. FIG. 6 shows the position trajectories, $x_d$ and $y_d$, (i.e., the uncompensated motion commands) of the desired path, as well as its velocity and acceleration profiles, as functions of time. Notice that the duration of the desired trajectories is 1 s (i.e., E=104, based on 10 kHz sampling frequency). The uncompensated trajectories are compared with the corresponding modified trajectories obtained from the proposed method. The proposed method is executed with B-splines of order m=5, having n+1=51 control points. Notice from FIG. 6 that the modified trajectories generated by the proposed method automatically satisfy the imposed kinematic constraints and do not have any delays (i.e., they last exactly as long as the desired trajectories).

Figure 7:
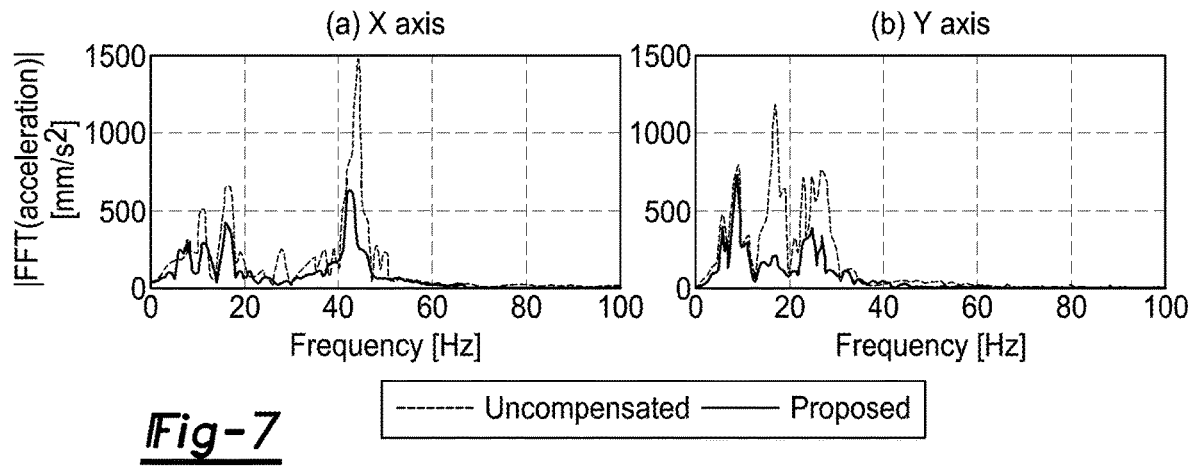
FIG. 7 shows the Fast Fourier Transform (FFT) of the measured acceleration signals of the fixture for the uncompensated and proposed trajectories.
Figure 8:
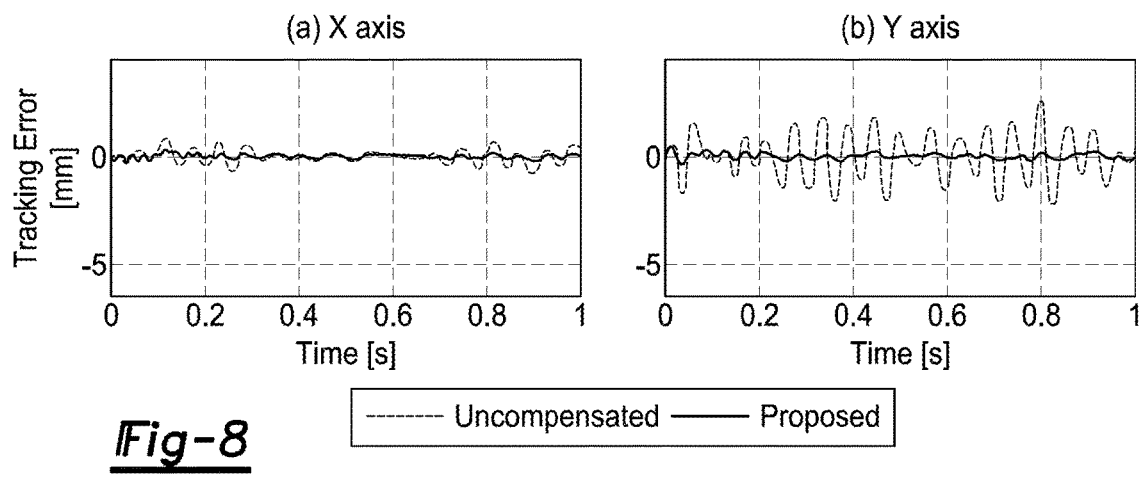
FIG. 8 shows the X and Y axis position tracking errors for the uncompensated and proposed methods.
Figure 9:
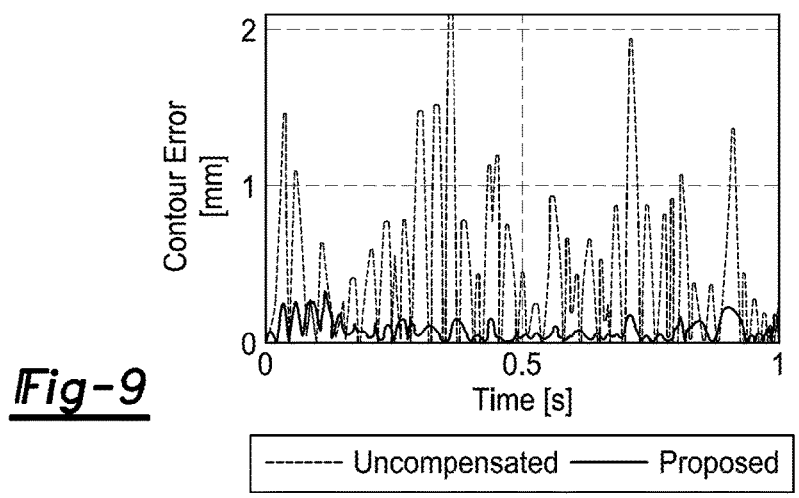
FIG. 9 shows the contour errors for uncompensated and proposed trajectory.

The position trajectories from the uncompensated and the proposed methods are applied to the X and Y axes of the stage as motion commands. FIG. 7 shows the Fast Fourier Transform (FFT) of the acceleration signals (measured using the accelerometers). The X-axis acceleration energy spectral densities are $6.38\times106$ $mm^2/s^4$ and $1.92\times106$ mm2/s4, while the Y-axis acceleration energy spectral densities are $7.32\times106$ mm2/s4 and $1.81\times106$ mm2/s4 for the uncompensated and the proposed methods, respectively. This means that the proposed method generates less vibration than the uncompensated. To demonstrate this fact, the tracking errors, xd-x and yd-y, for all three cases are plotted in FIG. 8, based on position signals (x and y) derived from the measured acceleration signals using an observer. The X-axis RMS tracking errors are 0.3014 mm and 0.0852 mm, while the Y-axis RMS tracking errors are 1.0165 mm and 0.1198 mm for the uncompensated and the proposed methods, respectively. FIG. 9 compares the contour errors of the three methods. Their RMS values are 0.5508 mm and 0.0880 mm for the uncompensated and the proposed methods, respectively, indicating the ability of the proposed method to indirectly reduce contour errors via minimizing tracking errors.

Examples on Limited Look Ahead Simulation

Figure 10:
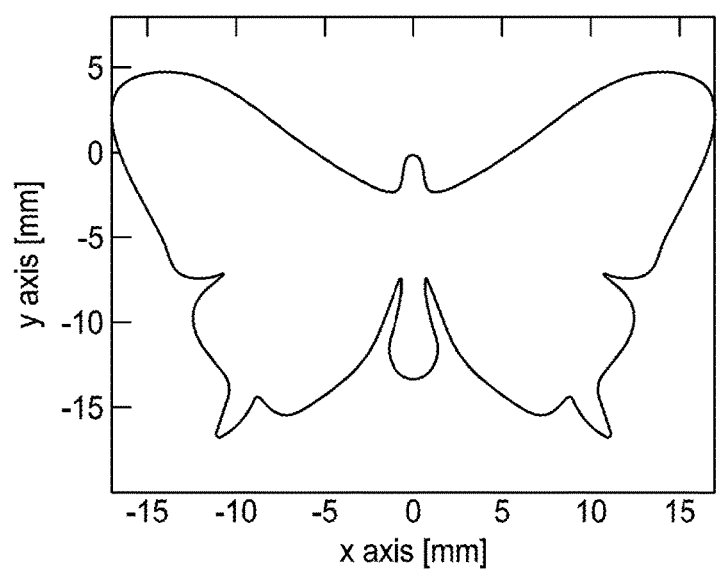
FIG. 10 shows the desired path used for simulations to analyze the limited look ahead capability
Figure 11:
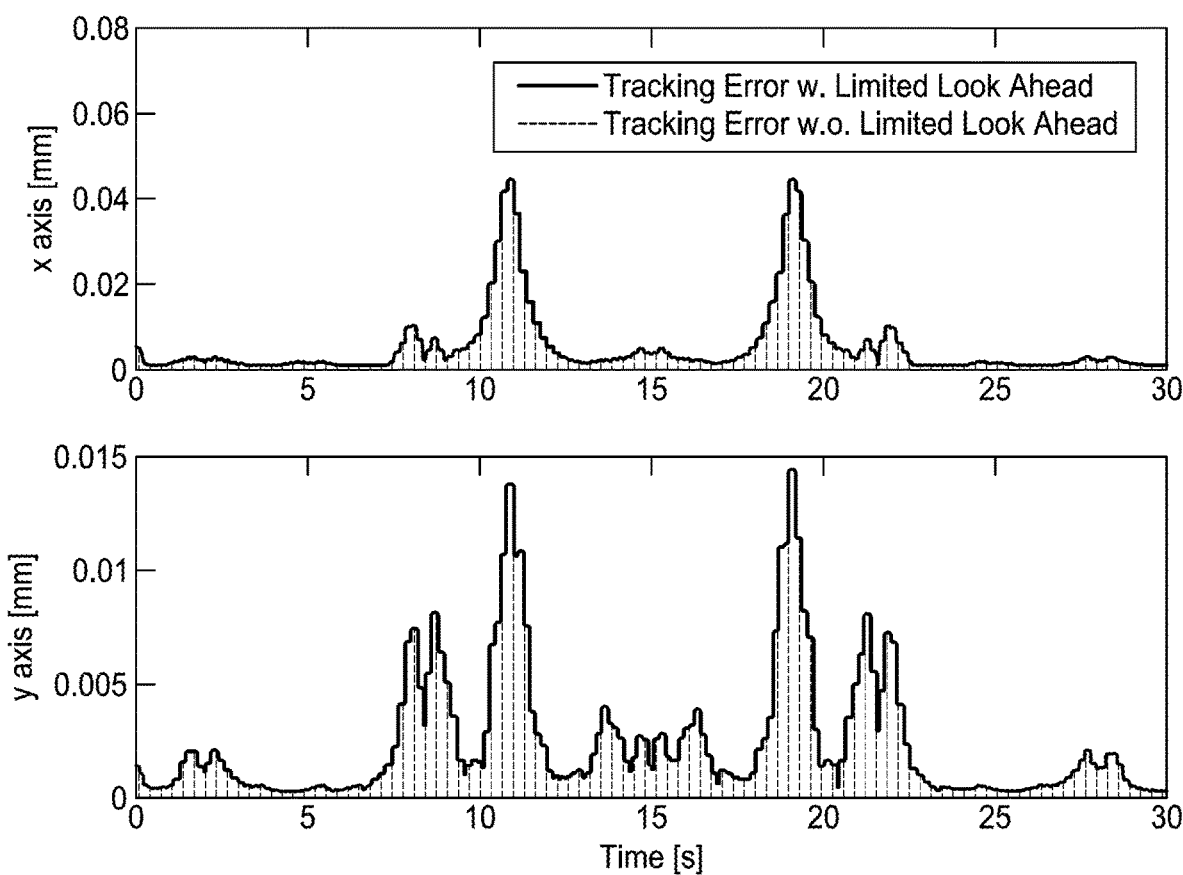
FIG. 11 shows the tracking errors with and without limited look ahead for the proposed method Corresponding reference numerals indicate corresponding parts throughout the several views of the drawings.

FIG. 11 shows the positioning performance tracking a butterfly shape trajectory (shown in FIG. 10) with and without limited look ahead, and the statistics are provided in Table 2. The tracking performances are identical however 96% of the computational time is saved with the limited look ahead implementation.

TABLE 2

Summary for tracking objective by using complete look ahead and the limited look ahead approaches for implementing the present method.

| | With Limited Look Ahead | With Complete Look Ahead |
|---|---|---|
| x axis RMS [μm] | 6.8 | 6.8 |
| y axis RMS [μm] | 2.5 | 2.5 |
| x axis max [μm] | 44.5 | 44.5 |
| y axis max [μm] | 14.3 | 14.3 |
| Computational Time [s] | 3.747267 | 65.149933 |

What is claimed is:

1. A method for minimizing tracking errors in dynamic systems, said method comprising:

obtaining desired trajectory data of the dynamic system;

obtaining a set of constraints on at least one of the desired and actual trajectories of the dynamic system;

obtaining a set of uniform or non-uniform rational B-splines having known original B-spline basis functions and at least one unknown B-spline coefficient;

applying a trajectory optimization process to the desired trajectory data including applying a transfer function of the dynamic system to forward filter the B-spline basis functions and utilizing the filtered B-spline basis functions to select optimal coefficients of the B-splines such that a resultant actual trajectory is substantially equal to the desired trajectory while satisfying the set of constraints on the at least one of the desired and actual trajectories; and outputting an optimal motion command signal in response to the trajectory optimization process to the dynamic system.

2. The method according to claim 1 wherein the step of applying a trajectory optimization process is performed using a subset of the desired trajectory data thereby amounting to limited look ahead functionality.

3. The method according to claim 1 wherein the dynamic system represents a CNC feed drive whose desired and actual trajectories represent desired and actual positions of the CNC feed drive, and wherein the constraints represent kinematic constraints on the at least one of the desired and actual trajectories of the CNC feed drive.

4. The method according to claim 3 wherein the kinematic constraints include at least one of position, velocity, acceleration and jerk limitations.

5. The method according to claim 1 wherein the trajectory optimization process minimizes a 2-norm of the errors in tracking the desired trajectory subject to the constraints.

6. The method according to claim 1 wherein the outputted optimal motion command is a modified position command delivered to a CNC feed drive.

7. The method according to claim 6 wherein the CNC feed drive has unwanted vibration modes.

8. The method according to claim 1, further comprising the optimization of other B-spline parameters including at least one of a knot vector, number of control points, and weights.

9. The method according to claim 1, further comprising optimization based on other metrics and norms other than a 2-norm.

10. The method according to claim 1, further comprising imposition of constraints on the dynamic system and B-spline basis functions.

11. The method according to claim 1, further comprising the combination of multiple dynamic systems, desired trajectories, and B-splines.

* * * * *